US011942786B2

(12) United States Patent
Lv et al.

(10) Patent No.: US 11,942,786 B2
(45) Date of Patent: Mar. 26, 2024

(54) POWER SUPPLY CIRCUIT, COMPENSATION CIRCUIT AND HARMONIC DISTORTION COMPENSATION METHOD THEREOF

(71) Applicant: SHANGHAI BRIGHT POWER SEMICONDUCTOR CO., LTD., Shanghai (CN)

(72) Inventors: Jianjing Lv, Shanghai (CN); Minmin Fan, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/948,557

(22) Filed: Sep. 20, 2022

(65) Prior Publication Data

US 2023/0095175 A1 Mar. 30, 2023

(30) Foreign Application Priority Data

Sep. 24, 2021 (CN) .......................... 202111123448.9

(51) Int. Cl.
*H02J 3/01* (2006.01)
*H02M 1/00* (2006.01)
(Continued)

(52) U.S. Cl.
CPC .............. *H02J 3/01* (2013.01); *H02M 1/0012* (2021.05); *H02M 1/0022* (2021.05); *H02M 1/12* (2013.01); *H02J 3/18* (2013.01)

(58) Field of Classification Search
CPC .... H02J 3/01; H02J 3/18; H02M 1/12; H02M 1/0012; H02M 1/0022
See application file for complete search history.

(56) References Cited

U.S. PATENT DOCUMENTS

2014/0225527 A1* 8/2014 Ge ...................... H02M 7/2176
363/44
2015/0022163 A1* 1/2015 Han .................... H02M 1/4208
323/205

(Continued)

FOREIGN PATENT DOCUMENTS

CN 107147301 A 9/2017
CN 108696158 A 10/2018

*Primary Examiner* — Jared Fureman
*Assistant Examiner* — Esayas G Yeshaw
(74) *Attorney, Agent, or Firm* — Muncy, Geissler, Olds & Lowe, P.C.

(57) ABSTRACT

A power supply circuit, a compensation circuit and a harmonic distortion compensation method thereof are disclosed. The power supply circuit includes a rectifier and filter module, a main power stage module, a voltage waveform detection module and a compensation module. The rectifier and filter module converts an AC voltage into a DC voltage. The main power stage module receives the DC voltage and provides power to a load. The voltage waveform detection module is configured to detect a waveform of the DC voltage and derive, from the waveform, information about each cycle of the DC voltage. The compensation module is configured to generate a compensation signal based on the information about each cycle of the DC voltage and trigger the main power stage module to perform compensation operation based on the compensation signal. The compensation operation is performed to accomplish total harmonic distortion compensation of the power supply circuit.

16 Claims, 6 Drawing Sheets

(51) Int. Cl.
*H02M 1/12* (2006.01)
*H02J 3/18* (2006.01)

(56) References Cited

U.S. PATENT DOCUMENTS

2018/0006577 A1    1/2018  Ng et al.
2019/0068050 A1*  2/2019  Colbeck .............. H02M 1/4225
2022/0346196 A1*  10/2022  Kang .................. H02M 1/4225

* cited by examiner

Fig. 1

Prior Art

Fig. 2

Prior Art

Fig. 3

Prior Art

POWER SUPPLY CIRCUIT, COMPENSATION CIRCUIT AND HARMONIC DISTORTION COMPENSATION METHOD THEREOF

CROSS-REFERENCES TO RELATED APPLICATIONS

This application claims the priority of Chinese patent application number 202111123448.9, filed on Sep. 24, 2021, the entire contents of which are incorporated herein by reference.

TECHNICAL FIELD

The present invention relates to the field of total harmonic distortion (THD) and, in particular, to a power supply circuit, a compensation circuit and a harmonic distortion compensation method thereof.

BACKGROUND

Harmonic distortion indicates that comparing with an input signal, an output signal has harmonic components. The sum of all additional harmonic levels is called total harmonic distortion (THD). Harmonic distortion is caused by incomplete linear system. THD is related to frequency.

More and more electricity consuming devices are being connected to power grids. Many such electricity consuming devices employ efficient switched-mode power supplies, rather than purely resistive ones. An input current that does not vary exactly with their input voltage. Since the input voltage has a periodic sinusoidal waveform, harmonic currents are used to characterize a deviation of the input current from sinusoidality. Harmonic currents will produce reactive power, increase loss of a power grid, accelerate aging of the power grid and electricity consuming devices, and interfere with communication, radar and audio/video devices in the power grid.

SUMMARY

The present invention provides a power supply circuit, a compensation circuit and a harmonic distortion compensation method thereof, which solve the prior art problem of interference of THD with a power grid and electricity consuming devices and achieve optimization of THD circuitry.

In a first aspect, the present invention provides a power supply circuit including a rectifier and filter module, a main power stage module, a voltage waveform detection module and a compensation module.

The rectifier and filter module is connected to a power source and configured to receive an AC voltage and convert the AC voltage into a DC voltage having a periodic dome-shaped waveform.

The main power stage module is electrically connected to the rectifier and filter module and configured to receive the DC voltage and provide power to a load based on the DC voltage.

The voltage waveform detection module is electrically connected to the rectifier and filter module and configured to detect the DC voltage and output waveform information of the DC voltage.

The compensation module is electrically connected to both the voltage waveform detection module and the main power stage module respectively and configured to generate a compensation signal based on rising phase information and falling phase information of each cycle of the DC voltage derived from the waveform information and trigger the main power stage module to perform a compensation operation based on the compensation signal. The compensation operation is configured to compensate total harmonic distortion of the power supply circuit.

In one embodiment of the present invention, the compensation signal indicates adjusting an on-time and/or an off-time of a power switch in the main power stage module.

In one embodiment of the present invention, during the on-time of the power switch in the main power stage, the compensation signal triggers the main power stage module to operate at least one of: decreasing the on-time in the rising phase of each cycle of the DC voltage; and increasing the on-time in the falling phase of each cycle of the DC voltage.

In one embodiment of the present invention, during the off-time of the power switch in the main power stage, the compensation signal triggers the main power stage module to operate at least one of: increasing the off-time in the rising phase of each cycle of the DC voltage; and decreasing the off-time in the falling phase of each cycle of the DC voltage.

In one embodiment of the present invention, the waveform information of the DC voltage contains a first comparison signal reflecting a result of a comparison between the DC voltage and a first comparison voltage and a second comparison signal reflecting a result of a comparison between the DC voltage and a second comparison voltage, wherein a value of the first comparison voltage is greater than a value of the second comparison voltage.

In one embodiment of the present invention, the voltage waveform detection module includes a voltage divider, a first comparator and a second comparator, the voltage divider having an input terminal to receive the DC voltage, the voltage divider having an output terminal to connect to both a positive input terminal of the first comparator and a negative input terminal of the second comparator, the first comparator having a negative input terminal connected to the first comparison voltage, the second comparator having a positive input terminal connected to the second comparison voltage.

In one embodiment of the present invention, the compensation module receives the first comparison signal and the second comparison signal, and produces a count signal according to the first comparison signal and the second comparison signal, the count signal reflecting a number indicative of the rising and falling phases of each cycle of the DC voltage.

In one embodiment of the present invention, the count signal is taken as the compensation signal.

In one embodiment of the present invention, the compensation module produces the compensation signal based on the count signal.

In one embodiment of the present invention, the compensation module, based on the first comparison signal, takes a period of time that the DC voltage is higher than the first comparison voltage in each cycle of the DC voltage as a first count, and based on both the first and second comparison signals, starts a counter upon the DC voltage rising to the first comparison voltage and outputs a second count until the DC voltage decays to the second comparison voltage in each cycle of the DC voltage, wherein the count signal reflects the second count minus half the first count.

In one embodiment of the present invention, the compensation module includes a flip-flop, a counter, an inverter, an oscillator, a register, a subtractor and a digital-to-analog converter, the flip-flop having an S terminal to receive the first comparison signal, the inverter then passing the first comparison signal on to the register, the flip-flop having an R terminal to receive the second comparison signal, the counter coupled to a Q terminal of the flip-flop, the oscillator, the register and the subtractor, the subtractor outputting the count signal to the digital-to-analog converter, the digital-to-analog converter connected to the main power stage module and configured to provide the compensation signal to the main power stage module.

In one embodiment of the present invention, in response to input of signals output from the first and second comparators to the flip-flop, an enable signal is produced and input to the counter, wherein when the enable signal transitions from a low level to a high level, the counter starts to increment from zero, wherein when the enable signal transitions from the high level to the low level, the counter is stopped and reset to zero, and wherein an output of the subtractor is an output of the counter minus half an output of the register.

In a second aspect, the present invention also provides a compensation circuit for use in a switched-mode power supply system for THD compensation in the switched-mode power supply system. The compensation circuit includes: a voltage waveform detection module configured to detect a direct current (DC) voltage having a periodic dome-shaped waveform and output waveform information of the DC voltage.

The voltage waveform detection module is configured to receive the waveform information and is configured to generate a compensation signal based on a rising phase information and a falling phases information of each cycle of the DC voltage derived from the waveform information. The compensation signal is configured to indicate a compensation operation to be performed for the switched-mode power supply system to accomplish the total harmonic distortion compensation in the switched-mode power supply system.

In one embodiment of the present invention, the compensation signal is configured to indicate adjusting an on-time and/or an off-time of a power switch in the switched-mode power supply system.

In one embodiment of the present invention, during the on-time of the power switch, the compensation signal triggers the power switch to operate at least one of: decreasing the on-time in the rising phase of each cycle of the DC voltage; and increasing the on-time in the falling phase of each cycle of the DC voltage.

In one embodiment of the present invention, during the off-time of the power switch, the compensation signal triggers the power switch to operate at least one of: increasing the off-time in the rising phase of each cycle of the DC voltage; and decreasing the off-time in the falling phase of each cycle of the DC voltage.

In a third aspect, the present invention also provides a harmonic distortion compensation method for a switched-mode power supply, including: detecting a rectified and filtered DC voltage having a periodic dome-shaped waveform; deriving, from the waveform, a rising phase information and a falling phase information of each cycle of the DC voltage; and generating a compensation signal based on the rising phase information and the falling phase information of each cycle, the compensation signal configured to trigger a main power stage module containing a power switch to perform a compensation operation based on the compensation signal, the compensation operation being performed to accomplish THD compensation of the switched-mode power supply system, wherein rising portions of the DC voltage waveform represent rising phases of individual cycles, and falling portions of the DC voltage waveform represent falling phases of individual cycles.

In one embodiment of the present invention, generating the compensation signal based on the rising phase information and the falling phase information of each cycle and triggering the main power stage module containing the power switch to perform the compensation operation based on the compensation signal includes:

during an on-time of the power switch in the main power stage module, the compensation signal triggering the main power stage module to operate at least one of:

decreasing the on-time in a rising phase of each cycle of an input voltage;

increasing an on-time in a falling phase of each cycle of the input voltage; and simultaneously decreasing the on-time in the rising phase of each cycle of the input voltage and increasing the on-time in the falling phase of each cycle of the input voltage; and during the off-time of the power switch in the main power stage module, the compensation signal triggering the main power stage module to operate at least one of:

increasing the off-time in the rising phase of each cycle of the input voltage;

decreasing the off-time in the falling phase of each cycle of the input voltage; and simultaneously increasing the off-time in the rising phase of each cycle of the input voltage and decreasing the off-time in the falling phase of each cycle of the input voltage, wherein the compensation signal indicates whether to change the on-time or off-time of the power switch in the main power stage, or to simultaneously change both the on-time and off-time of the power switch in the main power stage.

In the power supply circuit, compensation circuit and harmonic distortion compensation method of the present invention, through detecting the waveform of the input voltage, identify rising phase information and falling phase information of each cycle of the waveform and performing signal compensation, to reduce asymmetric of the rising phase information and falling phase information and valley cut-off distortion.

BRIEF DESCRIPTION OF THE DRAWINGS

In order to more clearly explain the techniques of the present invention or the prior art, the accompanying drawings, to which reference is to be made in connection with the following description of embodiments or the prior art, will be briefed below. Apparently, these drawings show only some embodiments of the invention, and those of ordinary skill in the art can obtain other drawings in light of those contained herein, without paying any creative effort.

DETAILED DESCRIPTION

Embodiments of the present invention will be described clearly and fully hereunder in conjunction with the appended drawings so that objects, aspects and advantages of the invention will become more apparent. Evidently, the embodiments set forth herein are merely some but not all possible embodiments of this invention. Any and all other embodiments devisable by skilled artisans in light of the disclosed embodiments without paying any creative effort are considered to fall within the scope of protection of this invention.

The terms "first," "second," and the like in the description, claims and drawings of this application are used for distinguishing between similar elements and not necessarily for describing a particular sequential or chronological order. It is to be understood that the terms so used are interchangeable under appropriate circumstances such that the embodiments described herein are capable of operation in sequences other than those illustrated or otherwise described herein.

Figure 1:
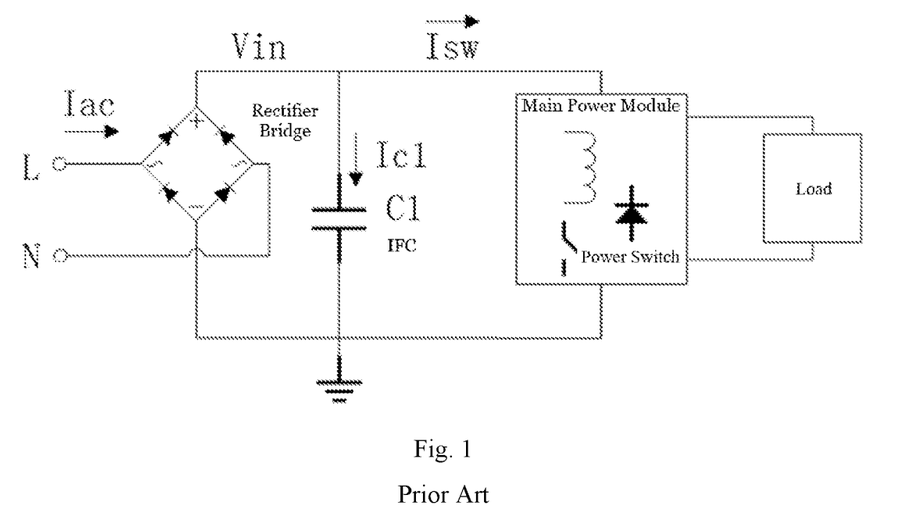
FIG. 1 is a schematic diagram of a conventional switched-mode power supply.

FIG. 1 is a schematic diagram of a conventional switched-mode power supply. As shown in FIG. 1, the switched-mode power supply includes a rectifier bridge and an input filter capacitor (IFC) C1. The IFC C1 is configured to convert an alternating current (AC) input voltage to a direct current (DC) voltage. The DC voltage is then converted by the switched-mode power supply to a power source required by a load.

In FIG. 1, the input current Iac is the sum of a current Ic1 for charging or discharging the IFC C1 and a current Isw flowing through a main power stage. That is, Iac=Ic1+Isw.

Where, Ic1=C1*dVin(t)/dt.

Figure 2:
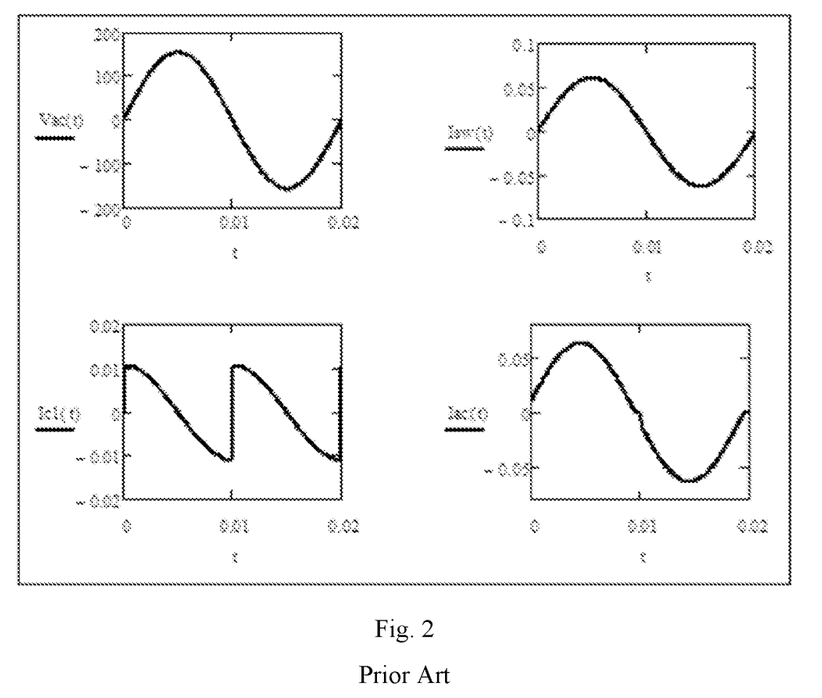
FIG. 2 shows waveforms with input current distortion caused by C1 at Vac=110 Vrms.
Figure 3:
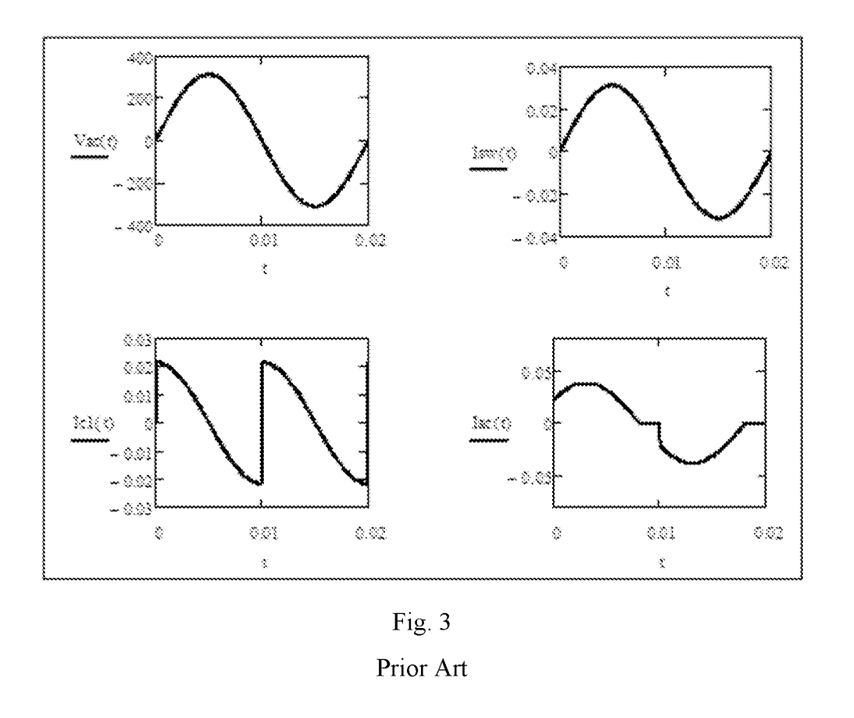
FIG. 3 shows waveforms with input current distortion caused by C1 at Vac=220 Vrms.

Reference is made to FIGS. 2 to 3 to describe how the IFC C1 affects total harmonic distortion (THD).

It is assumed that the main power stage is a constant-power purely resistive load with a resistance Rsw which is 10 kΩ at 220 Vrms, or 2.5 kΩ at 110 Vrms. It is also assumed that fac=50 Hz and C1=220 nF. Related waveforms at Vac=110 and 220 Vrms are shown in FIGS. 2 and 3 respectively. FIG. 2 shows waveforms with input current distortion caused by C1 at Vac=110 Vrms, and FIG. 3 shows waveforms with input current distortion caused by C1 at Vac=220 Vrms. It can be seen from FIGS. 2 and 3 that:

1) Iac distortion is manifested as asymmetric of Vac absolute value rising (a rising phase of each cycle) and Vac absolute value falling (a falling phase of each cycle) and valley cut-off distortion, which contribute much to THD; and 2) when Vac value is high, Tc1 increases while Isw decreases, leading to greater Iac distortion.

Therefore, the IFC C1 contributes more to input current THD at high Vac value, it is necessary to optimize the circuit.

To sum up, as reactive power caused by harmonic currents will increase loss of a power grid, speed up aging of the grid and electricity consuming devices and interfere with communication, radar, audio/video and other devices in the grid, the problem to be solved by the present invention is the suppression of harmonic currents and total harmonic distortion (THD) optimization of IFC circuitry.

It should be noted that a power supply circuit provided in the present invention is applicable to a LED driving power supply in need of low THD.

A power supply circuit, a method of implementation, a switched-mode power supply and an electronic device according to the present invention will be described below with reference to FIGS. 4 to 11.

Figure 4:
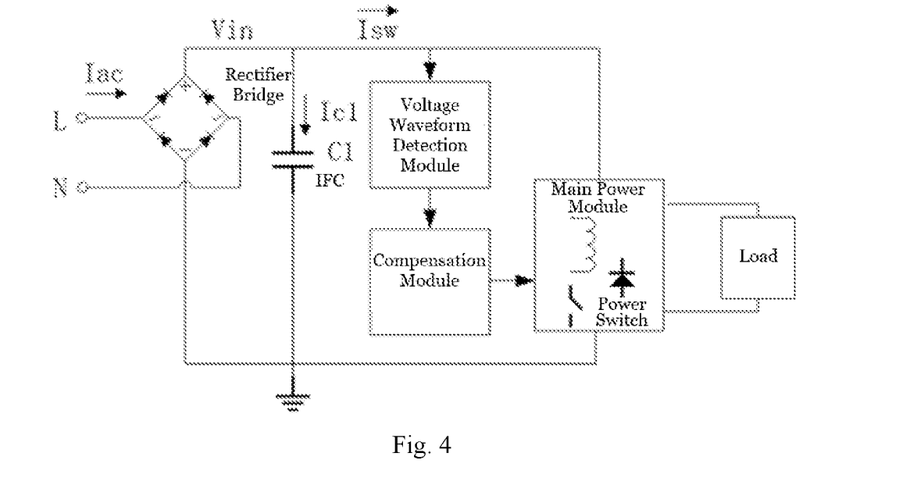
FIG. 4 is a schematic diagram of a power supply circuit according to the present invention.

FIG. 4 is a schematic diagram of the power supply circuit of the present invention. As shown in FIG. 4, the power supply circuit includes a rectifier and filter module, a main power stage module, a voltage waveform detection module and a compensation module. The rectifier and filter module is connected to a power source in order to receive an AC voltage. It then converts the AC voltage to a DC voltage having a periodic dome-shaped waveform.

For example, the rectifier and filter module includes a rectifier bridge and an input filter capacitor (IFC) C1.

An input terminal of the rectifier bridge is connected to the AC power source (L, N) to receive the AC voltage. It then converts the AC voltage to the DC voltage.

For example, the input terminal of the rectifier bridge is connected to the AC power source. Moreover, a positive output terminal of the rectifier bridge is connected to the IFC C1, and a negative output terminal of the rectifier bridge is connected to a load of the main power stage. The DC voltage is provided at the positive and negative output terminals of the rectifier bridge. The IFC C1 is connected respectively at the positive and negative output terminals of the rectifier bridge in order to filter the DC voltage. The positive output terminal of the rectifier bridge is connected to the voltage waveform detection module.

For example, the main power module is connected to the rectifier and filter module to receive the DC voltage and provide power to the load based on the DC voltage.

An input current Iac is the sum of a current Ic1 for charging or discharging the IFC C1 and a current Isw through the main power stage. That is, Iac=Ic1+Isw.

Where, Ic1=C1*dVin(t)/dt. For example, the voltage waveform detection module is electrically connected to the rectifier and filter module to detect the DC voltage and output waveform information thereof.

The voltage waveform detection module is electrically connected to the positive output terminal of the rectifier bridge. The voltage waveform detection module gains rising phase information and falling phase information of each DC voltage cycle of the DC voltage according to the detected waveform of the DC voltage Vin. In this way, the voltage waveform detection module gains information about variation of the DC voltage Vin over time in each cycle.

The compensation module is electrically connected to both the voltage waveform detection module and the main power stage module and is adapted to generate a compensation signal based on the rising phase information and the falling phase information in each DC voltage cycle derived from the waveform information and trigger the main power stage module to perform a compensation operation based on the compensation signal. The compensation operation is performed for THD compensation of the power supply circuit.

The compensation signal indicates adjusting an on-time and/or an off-time of a power switch in the main power stage module, i.e., an amount of compensation time.

During the on-time of the power switch in the main power stage, the compensation signal triggers the main power stage module to operate at least one of:
- decreasing the on-time in the rising phase of each cycle of the DC voltage; and
- increasing the on-time in the falling phase of each cycle of the DC voltage.

During the off-time of the power switch in the main power stage, the compensation signal triggers the main power stage module to operate at least one of:
- increasing the off-time in the rising phase of each cycle of the DC voltage; and
- decreasing the off-time in the falling phase of each cycle of the DC voltage.

Rising portion of the DC voltage waveform represents rising phase of each cycle, and falling portion of the DC voltage waveform represents falling phase of each cycle.

Figure 6:
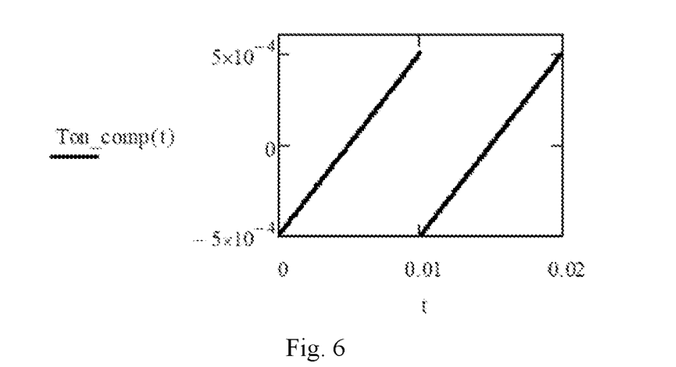
FIG. 6 schematically illustrates a compensation time for Ton according to the present invention.
Figure 7:
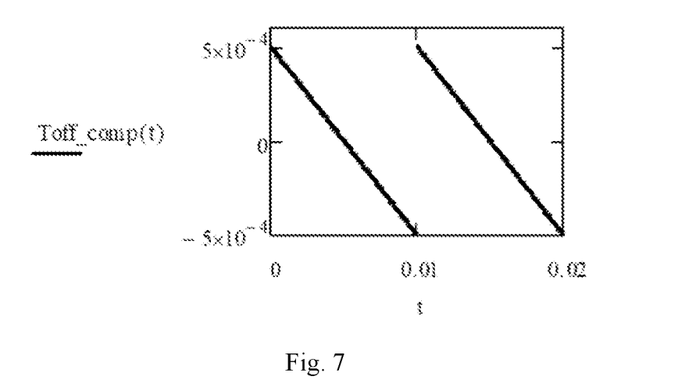
FIG. 7 schematically illustrates a compensation time for Toff according to the present invention.

It is to be noted that the performance of the compensation operation based on the compensation signal means calculation of compensation times Ton_comp (t) and Toff_comp (t) (as shown in FIGS. 6 and 7) based on the compensation signal.

Therefore, the present invention calculates the corresponding compensation times according to the detected waveform of the DC voltage Vin, and adjusting the on-time and/or off-time of the power switch in the main power stage module to compensate for the total harmonic distortion (THD) of the power supply circuit, thereby decreasing the total harmonic distortion (THD).

Thus, taking into account the nature of the contribution of charging and discharging of the IFC C1 to THD, the present invention accomplishes compensation through detecting the waveform of the DC voltage Vin and identifying the rising and falling phases of each cycle of the Vin waveform, thereby reducing asymmetric of the rising and falling phases and valley cut-off distortion.

The compensation operation during the rising and falling phases of each cycle of the DC voltage Vin and during the on- and off-times will be described below with reference to FIGS. 5 to 7.

Figure 5:
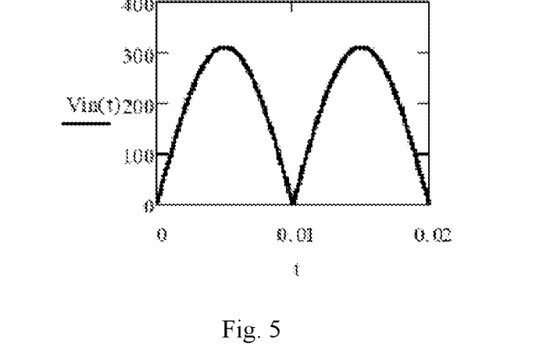
FIG. 5 shows an input voltage waveform according to the present invention.

FIG. 5 shows an input voltage waveform according to the present invention. FIG. 6 schematically illustrates a compensation time for Ton according to the present invention. FIG. 7 schematically illustrates a compensation time for Toff according to the present invention.

The waveform shown in FIG. 5 represents variation of the DC voltage Vin over time (t). The rising phase in each cycle lasts from 0 ms to 5 ms (i.e., from 0 s to 0.005 s), and the DC voltage Vin increases with time in this phase. The falling phase in each cycle lasts from 5 ms to 10 ms (i.e., from 0.005 s to 0.01 s), and the DC voltage Vin decrease with time in this phase. As shown in FIGS. 6 and 7, in the rising phase of each cycle, Ton (on-time) is negative (indicating "decrease"), and Toff (off-time) is positive (indicating "increase"). That is, negativity indicates "decrease", and positivity indicates "increase".

Specifically, the amount of compensation time includes an amount of compensation time for the on-time (Ton) and an amount of compensation time for the off-time (Toff). There exist many mechanisms for turning on and off the switch in the main power stage, and the present invention is not limited to any particular one of such mechanisms.

As shown in FIG. 6, when the amount of compensation time is for Ton, in the rising phase of each cycle (from 0 s to 0.005 s), a compensation time for Ton is negative, resulting in a decrease in Ton. With the DC voltage Vin rising (as shown in FIG. 5), an absolute value of the compensation time decreases, and the amount of compensation time reduces to zero at a peak of the input voltage (as can be seen, the peak of the rising phase of each cycle in FIG. 5 and the amount of compensation time is zero of the rising phase of each cycle in FIG. 6). In the falling phase of each cycle (from 0.005 s to 0.01 s), the amount of compensation time for Ton is positive, resulting in an increase in Ton. With the DC voltage Vin decreasing, the absolute value of the compensation time increases, and the amount of compensation time increases to maximum at a valley of the input voltage (as shown in FIG. 6, the maximum of the amount of compensation time is $5\times10^{-4}$).

As shown in FIG. 7, when the amount of compensation time is for Toff, in the rising phase of each cycle (from 0 s to 0.005 s), the compensation time for Toff is positive, resulting in an increase in Toff. In the falling phase of each cycle (from 0.005 s to 0.01 s), the compensation time for Toff is negative, resulting in a decrease in Toff. The amount of compensation time is zero at peaks of the DC voltage Vin and maximum at valleys thereof.

It is to be noted that the compensation time waveforms shown in FIGS. 6 and 7 are merely exemplary, and the present invention is not limited to these examples. For example, the start points shown in the figures may be delayed, and the end points may be advanced. The maximal absolute values and ramping slopes may be not constants. However, the absolute value must be minimum closing to peaks of the DC voltage Vin and maximum at valleys thereof.

Specific circuit implementations and operating principles of the voltage waveform detection module and the compensation module will be described below with reference to FIGS. 8 and 9.

Figure 8:
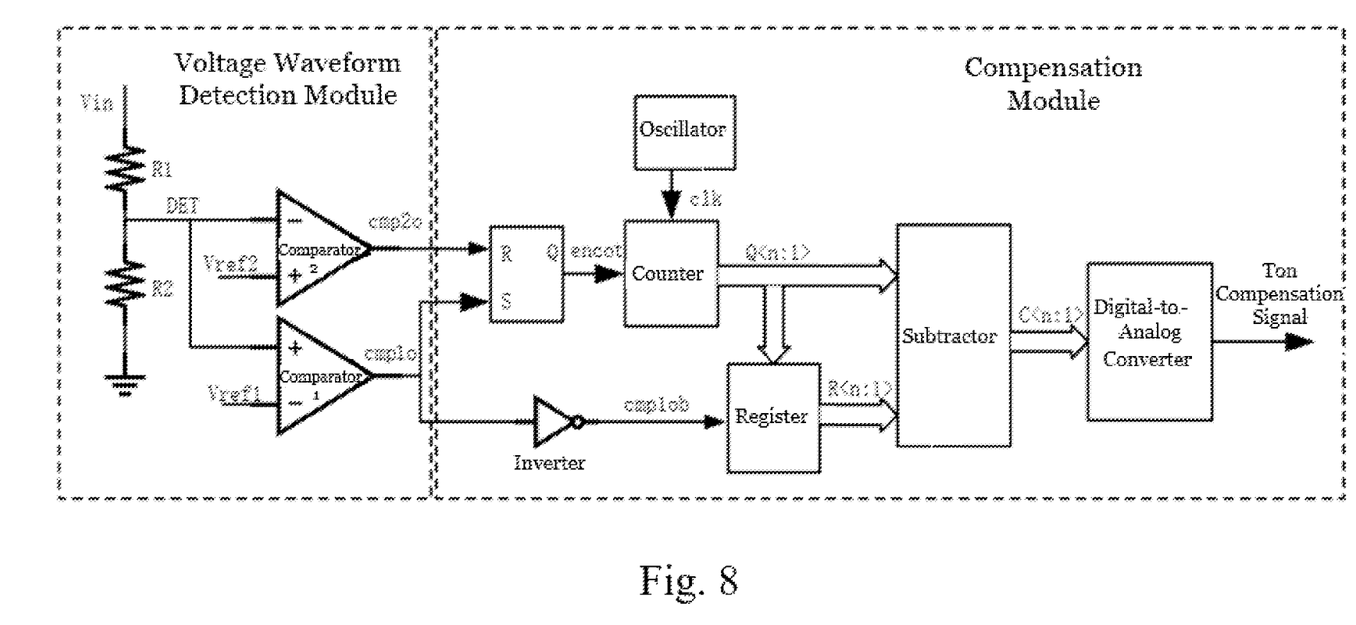
FIG. 8 shows a circuit according to an embodiment of the present invention.
Figure 9:
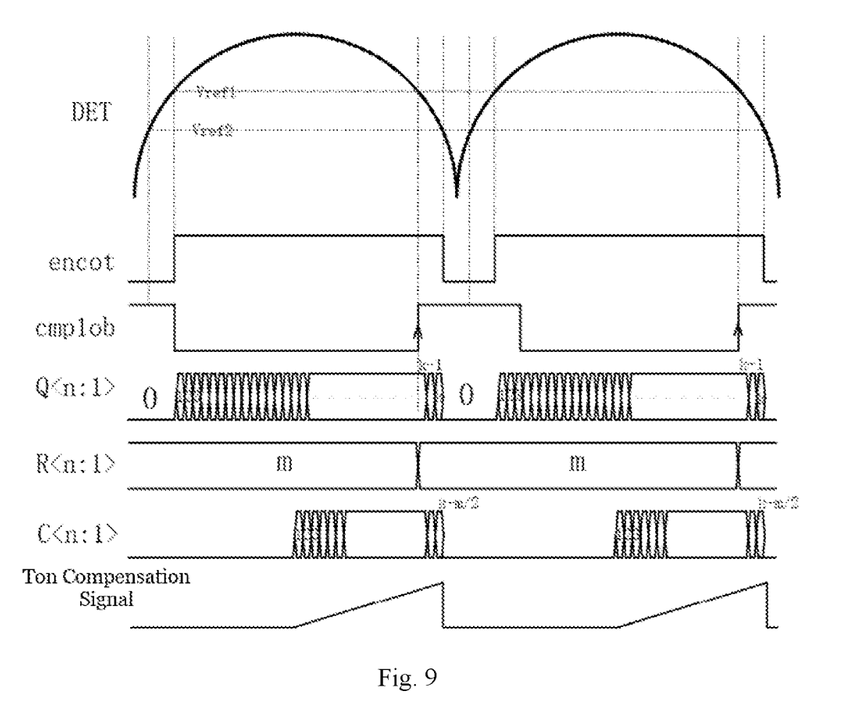
FIG. 9 shows a waveform in the embodiment of FIG. 8.

FIG. 8 shows a circuit diagram according to an embodiment of the present invention, and FIG. 9 shows a waveform in the embodiment of FIG. 8.

For example, the voltage waveform detection module includes a voltage divider, a first comparator and a second comparator. The DC voltage is received at an input terminal of the voltage divider, and both a positive input terminal of the first comparator and a negative input terminal of the second comparator are connected to an output terminal of the voltage divider. A negative input terminal of the first comparator is connected to a first comparison voltage, and a positive input terminal of the second comparator is connected to a second comparison voltage.

For example, the aforementioned waveform information of the DC voltage includes a first comparison signal reflecting a result of a comparison between the DC voltage and the first comparison voltage and a second comparison signal reflecting a result of a comparison between the DC voltage and the second comparison voltage. A value of the first comparison voltage is greater than a value of the second comparison voltage.

For example, the voltage divider includes a resistor R1 and a resistor R2.

As shown in FIG. 8, the voltage waveform detection module includes the resistor R1, the resistor R2, the first comparator 1 ("Comparator 1" in the figure) and the second comparator 2 ("Comparator 2" in the figure). The resistor R1 and the resistor R2 are connected in series and then ground. Both the first comparator 1 and the second comparator 2 are connected to a node between the series-connected resistor R1 and resistor R2. As a result of the DC voltage Vin passing through the resistor R1, a divided voltage detection signal DET is output. The divided voltage detection signal DET is coupled to both the "+" terminal of the first comparator 1 and the "−" terminal of the second comparator 2. Vref1 denotes a reference voltage 1 that is coupled to the "−" terminal of the first comparator 1, and Vref2 denotes a reference voltage 2 that is coupled to the "+" terminal of the second comparator 2. An output signal of the first comparator 1 is denoted as cmp1o, and an output signal of the second comparator 2 as cmp2o. The reference voltages 1 and 2 are output from reference sources.

For example, the compensation module receives the first and second comparison signals and produces, on the basis thereof, a count signal reflecting a number adapted to indicate the rising and falling phases of each cycle of the DC voltage.

For example, if a post stage connecting to the compensation module is a digital control circuit, then the count signal is directly used as the compensation signal. If a post stage connecting to the compensation module is an analog control circuit, then it generates the compensation signal according to the count signal.

For example, based on the first comparison signal, the compensation module takes a period of time that the DC voltage is higher than the first comparison voltage in each cycle as a first count. Moreover, based on the first and second comparison signals, in each cycle, a counter is started upon the DC voltage rising to the first comparison voltage and a second count is output until the DC voltage drops to the second comparison voltage. The count signal reflects the second count minus half the first count.

For example, the compensation module includes a flip-flop, a counter, an inverter, an oscillator, a register, a subtractor and a digital-to-analog converter. The first comparison signal is received at an S terminal of the flip-flop and passed on to the register via the inverter. The second comparison signal is received at an R terminal of the flip-flop, and the counter is coupled to a Q terminal of the flip-flop, the oscillator, the register and the subtractor. The count signal output from the subtractor to the digital-to-analog converter. The digital-to-analog converter is connected to the main power stage module in order to provide the compensation signal to the main power stage module.

The operating principles of the voltage waveform detection module and the compensation module are explained below.

The DC voltage Vin is attenuated by the resistors R1 and R2, and the divided voltage detection signal DET is obtained thereby. The divided voltage detection signal DET is then input to both the first comparator 1 and the second comparator 2. At the same time, the reference voltage 1 Vref1 and the reference voltage 2 Vref2 are input to the first comparator 1 and the second comparator 2, respectively, and comparisons are then performed, resulting in the output signals cmp1o and cmp2o. Wherein, Vref1>Vref2. If DET>Vref1, cmp1o is at a high level. Otherwise, it is at a low level. If DET>Vref2, cmp2o is at a low level. Otherwise, it is at a high level. The reference voltage 1 Vref1 and the reference voltage 2 Vref2 are output from reference sources.

The two output signals cmp1o and cmp2o, which are output from the first comparator 1 and second comparator 2, respectively, are input to the RS flip-flop, and an enable signal encot is responsively produced and input to the counter. The oscillator outputs a clock signal clk to the counter. As can be seen from FIG. 9, when the divided voltage detection signal DET rises beyond the reference voltage 1 Vref1 (at a rising edge of cmp1o), if the enable signal encot transitions from the low level to the high level, the counter starts to increment from 0. When the divided voltage detection signal DET beyond the reference voltage 2 Vref2 (at a rising edge of cmp2o), if the enable signal encot transitions from the high level to the low level, the counter is stopped and reset to zero. Q<n:1> represents an n output of the counter, which indicates a final result that is equal to k. Upon the divided voltage detection signal DET decreasing beyond the reference voltage 1 Vref1 (at a rising edge of cmp1ob), the result of the counter is provided to the register. At this time, Q<n:1>=m. Responsively, an output R<n:1> of the register is updated to m. At a steady state, R<n:1> is constantly maintained at m. An output C<n:1> of the subtractor is the counter output Q<n:1> minus half the register output R<n:1>. That is, C<n:1>=Q<n:1>−m/2.

As can be seen from FIG. 9, when the DC voltage Vin is rising, C<n:1> is away below 0, and the amount of compensation time for Ton is zero (assuming C<n:1> must be positive). With the DC voltage Vin decreasing from a peak, C<n:1>, as well as the amount of compensation time of the Ton compensation signal, starts to increase from 0. The counter is stopped at the maximum value k−m/2. At this time, the amount of compensation time for Ton is maximum.

Optionally, the amount of compensation time may vary linearly over one half of a mains cycle, as represented by the following formula:

$$\mathrm{delta}(Ton)(t)=k*t,$$

where, Ton denotes the on-time, t is the time in the rising and falling phases of each cycle, and k is the aforementioned counter output.

Through adding the amount of compensation time for Ton to power control in the main power stage, Ton starts to increase from a peak in the falling phase of each cycle and increase to maximum at a valley. This can reduce asymmetry of the rising and falling phases of each cycle of the input current and suppress valley cut-off distortion, thus resulting in reduced total harmonic distortion (THD).

It is to be noted that the present invention is not limited to the positive compensation for Ton only in the falling phase of each cycle as described above in connection with the foregoing embodiments for reducing asymmetry of the rising and falling phases of each input current cycle caused by the input filter capacitor (IFC), because any such compensation approach based on the use of the detected waveform of the DC voltage Vin and identification of the rising and falling phases of each cycle is considered to fall within the scope of protection of the present invention.

As can be seen from the above description, the power supply circuit of the present invention is effective, simple and reliably and dispenses with the need for a compensation logic built based on complicated digital circuit modules. Therefore, it is convenient to complement and low in cost.

In other embodiments of the present invention, there is provided a compensation circuit suitable for use for THD compensation in a switched-mode power supply system. The compensation circuit includes:

a voltage waveform detection module adapted to detect a DC voltage having a periodic dome-shaped waveform and output waveform information of the DC voltage.

The voltage waveform detection module receives the waveform information and is adapted to generate a compensation signal based on a rising phase information and a falling phase information in each cycle of the DC voltage derived from the waveform information. The compensation signal indicates a compensation operation to be performed for the switched-mode power supply system to accomplish THD compensation in the switched-mode power supply system.

For example, the compensation signal indicates adjusting an on-time and/or an off-time of a power switch in the switched-mode power supply system.

For example, during the on-time of the power switch, the compensation signal triggers the power switch to operate at least one of:

decreasing the on-time in the rising phase of each DC voltage cycle; and increasing the on-time in the falling phase of each DC voltage cycle.

For example, during the off-time of the power switch, the compensation signal triggers the power switch to operate at least one of:

increasing the off-time in the rising phase of each DC voltage cycle; and decreasing the off-time in the falling phase of each DC voltage cycle.

It to be noted that reference can be made to the above description of the power supply circuit for details in the compensation circuit and a further detailed description thereof is deemed unnecessary.

A harmonic distortion compensation method for a switched-mode power supply according to the present invention will be described below. Cross-reference may be made between the harmonic distortion compensation method described below and the power supply circuit described above.

Figure 10:
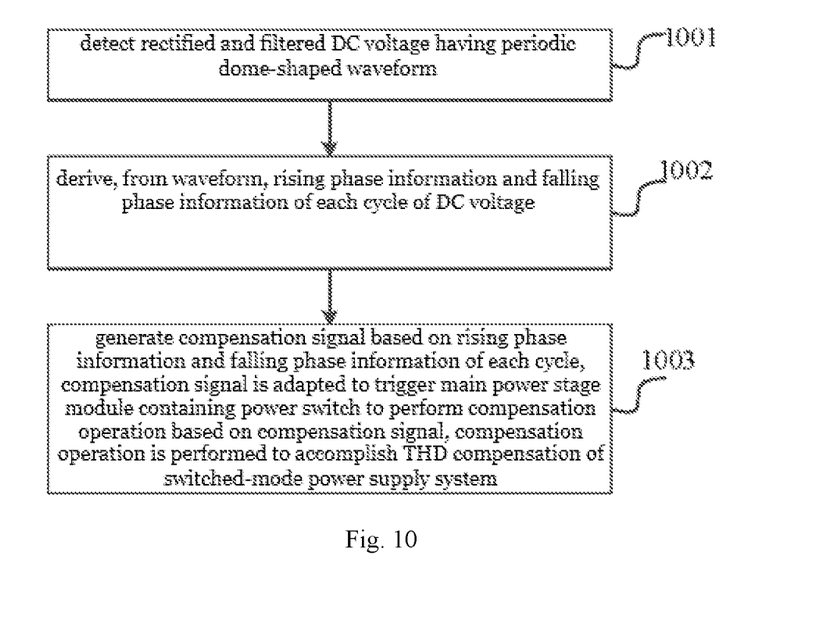
FIG. 10 is a flowchart of a harmonic distortion compensation method for a switched-mode power supply according to the present invention.

FIG. 10 is a flow diagram of the harmonic distortion compensation method for a switched-mode power supply according to the present invention. The harmonic distortion compensation method is used in a circuit for providing a power source for a load in a main power stage using an input voltage and includes the steps as follows.

Step 1001: Detect a rectified and filtered DC voltage having a periodic dome-shaped waveform.

Step 1002: Derive, from the waveform, a rising phase information and a falling phase information of each cycle of the DC voltage.

Optionally, steps 1001 and 1002 can be implemented by a voltage waveform detection module. Reference can be made to the above description for a circuit structure of the voltage waveform detection module.

Step 1003: Generate a compensation signal based on the rising phase information and the falling phase information of each cycle. The compensation signal is used to trigger a main power stage module containing a power switch to perform a compensation operation based on the compensation signal. The compensation operation is performed to accomplish THD compensation of the switched-mode power supply.

Rising portions of the DC voltage waveform represent rising phases of individual cycles, and falling portions of the DC voltage waveform represent falling phases of individual cycles.

Optionally, step 1003 can be implemented by a compensation module. Reference can be made to the above description for a circuit structure of the compensation module.

Optionally, triggering the main power stage module containing the power switch to perform the compensation operation based on the compensation signal which is generated based on the rising phase information and the falling phase information of each cycle includes:

during an on-time of the power switch in the main power stage module, the compensation signal triggering the main power stage module to operate one of:

decreasing the on-time in the rising phase of each cycle of a input voltage; increasing an on-time in the falling phase of each cycle of the input voltage; simultaneously decreasing the on-time in the rising phase of each cycle of the input voltage and increasing the on-time in the falling phase of each cycle of the input voltage;

during the off-time of the power switch in the main power stage module, the compensation signal triggering the main power stage module to operate one of:

increasing the off-time in the rising phase of each cycle of the input voltage; decreasing the off-time in the falling phase of each cycle of the input voltage; and simultaneously increasing the off-time in the rising phase of each cycle of the input voltage and decreasing the off-time in the falling phase of each cycle of the input voltage.

The compensation signal indicates whether to change the on-time or off-time of the power switch in the main power stage, or to simultaneously change both the on-time and off-time of the power switch in the main power stage.

Optionally, the present invention further provides a switched-mode power supply including the power supply circuit as defined above.

Figure 11:
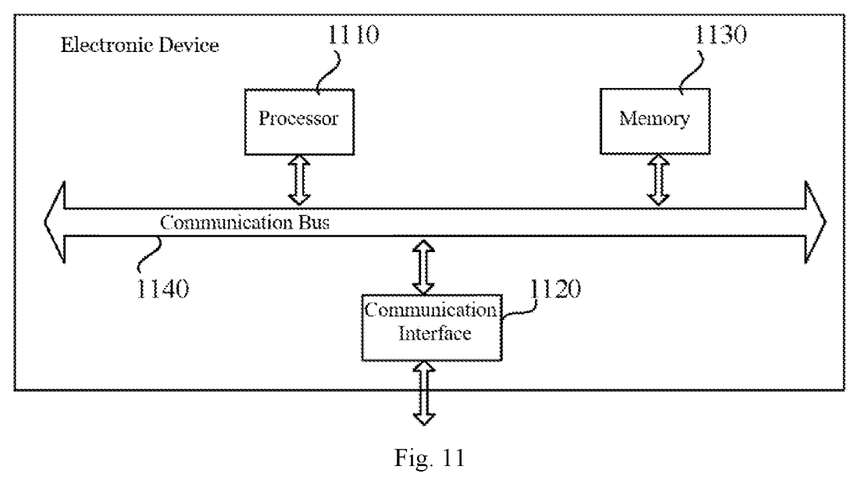
FIG. 11 is a schematic diagram showing the structure of an electronic device according to the present invention.

FIG. 11 shows a schematic diagram showing the structure of an exemplary electronic device. As shown in FIG. 11, the electronic device may include a processor 1110, a communications interface 1120, a memory 1130 and a communications bus 1140. The processor 1110, the communications interface 1120 and the memory 1130 communicate with one another via the communications bus 1140. The processor 1110 can invoke logic instructions in the memory 1130 to implement the harmonic distortion compensation method for a switched-mode power supply. The method includes:

detecting a rectified and filtered DC voltage having a periodic dome-shaped waveform;

deriving, from the waveform, a rising phase information and a falling phase information of each cycle of the DC voltage; and generating a compensation signal based on the rising phase information and the falling phase information of each cycle. The compensation signal is used to trigger a main power stage module containing a power switch to perform a compensation operation based on the compensation signal. The compensation operation is performed to accomplish THD compensation of the switched-mode power supply.

Rising portions of the DC voltage waveform represent rising phases of individual cycles, and falling portions of the DC voltage waveform represent falling phases of individual cycles.

When implemented as a software functional block and sold or used as a separate product, the logic instructions in the memory 1130 may be stored on a computer-readable storage medium. With this in mind, the subject matter of the present invention is per se, or the part thereof that is advantageous over the prior art, or part of the subject matter, may be embodied as a software product stored on a storage medium and containing a number of instructions for causing a computing device (which may be a personal computer, a server, a network appliance, etc.) to carry out all or some steps in methods provided in various embodiments of this application.

Examples of the storage medium include various media that can store program codes, such as flash memory, removable hard disk drives, read-only memory (ROM), random access memory (RAM), magnetic disk storage devices and optical disk storage devices.

In another aspect, the present invention provides a computer program product including a computer program stored on a non-transitory computer-readable storage medium. The computer program includes program instructions which, when executed by a computer, cause the computer to implement the harmonic distortion compensation method for a switched-mode power supply as described above in connection with the foregoing embodiments.

In yet another aspect, the present invention provides a non-transitory computer-readable storage medium storing thereon a computer program, which when executed by a processor, implements the harmonic distortion compensation method for a switched-mode power supply as described above in connection with the foregoing embodiments.

The device embodiments described above are only illustrative. Modules that have been described as separate components herein may be physically separated or not, and components that have been shown as modules may be physical modules or not. They may be deployed in a single location or distributed across a plurality of network devices. As actually needed, either all or some of such modules may be selected in accordance with embodiments disclosed herein. Those of ordinary skill in the art may understand and practice them without paying any creative effort.

From the description of the above embodiments, it is apparent to those skilled in the art that the various embodiments may be implemented by a combination of software and a necessary generic hardware platform. Of course, it may also be implemented by hardware. With this understanding in mind, the above embodiments are per se, or the part thereof advantageous over the prior art, may be embodied as a software product, which is stored on a computer-readable storage medium, such as a ROM/RAM, magnetic disk or CD-ROM, and contains a number of instructions for causing a computing device (which may be a personal computer, a server, a network appliance, etc.) to carry out the methods according to the various embodiments or part thereof.

Finally, it is to be noted that the foregoing embodiments are provided merely to illustrate the techniques of the present invention and are not intended to limit it in any sense. Although the present invention has been described in detail with reference to the above embodiments, those of ordinary skill in the art will appreciate that modifications to those embodiments are still possible, or all or some of the technical features thereof can be equivalently substituted, without causing the essence of them to depart from the scope of the various embodiments of the present invention.

What is claimed is:

1. A power supply circuit comprising a rectifier and filter module with an input filter capacitor, a main power stage module, a voltage waveform detection module and a compensation module,
   the rectifier and filter module being connected to a power source and configured to receive an alternating current (AC) voltage and convert the AC voltage into a direct current (DC) voltage having a periodic dome-shaped waveform,
   the main power stage module being electrically connected to the rectifier and filter module and configured to provide power to a load based on the DC voltage,
   the voltage waveform detection module being electrically connected to the rectifier and filter module and configured to detect the DC voltage and output waveform information of the DC voltage,
   the compensation module being electrically connected to both the voltage waveform detection module and the main power stage module respectively and configured to generate a compensation signal based on rising phase information and falling phase information of each cycle of the DC voltage derived from the waveform information and trigger the main power stage module to perform a compensation operation based on the compensation signal, the compensation operation configured to compensate total harmonic distortion of the power supply circuit,
   wherein the compensation signal indicates adjusting an on-time and/or an off-time of a power switch in the main power stage module.

2. The power supply circuit according to claim 1, wherein during the on-time of the power switch in the main power stage, the compensation signal triggers the main power stage module to operate at least one of:
   decreasing the on-time in the rising phase of each cycle of the DC voltage; and
   increasing the on-time in the falling phase of each cycle of the DC voltage.

3. The power supply circuit according to claim 2, wherein during the off-time of the power switch in the main power stage, the compensation signal triggers the main power stage module to operate at least one of:
   increasing the off-time in the rising phase of each cycle of the DC voltage; and
   decreasing the off-time in the falling phase of each cycle of the DC voltage.

4. The power supply circuit according to claim 1, wherein the waveform information of the DC voltage contains a first comparison signal reflecting a result of a comparison between the DC voltage and a first comparison voltage and a second comparison signal reflecting a result of a comparison between the DC voltage and a second comparison voltage, and wherein a value of the first comparison voltage is greater than a value of the second comparison voltage.

5. The power supply circuit according to claim 4, wherein the voltage waveform detection module comprises a voltage divider, a first comparator and a second comparator, the voltage divider having an input terminal to receive the DC voltage, the voltage divider having an output terminal to connect to both a positive input terminal of the first comparator and a negative input terminal of the second comparator, the first comparator having a negative input terminal connected to the first comparison voltage, the second comparator having a positive input terminal connected to the second comparison voltage.

6. The power supply circuit according to claim 4, wherein the compensation module receives the first comparison signal and the second comparison signal, and produces a count signal according to the first comparison signal and the second comparison signal, the count signal reflecting a number indicative of the rising and falling phases of each cycle of the DC voltage.

7. The power supply circuit according to claim 6, wherein the count signal is taken as the compensation signal.

8. The power supply circuit according to claim 6, wherein the compensation module produces the compensation signal based on the count signal.

9. The power supply circuit according to claim 6, wherein the compensation module, based on the first comparison signal, takes a period of time that the DC voltage is higher than the first comparison voltage in each cycle of the DC voltage as a first count, and based on both the first and second comparison signals, starts a counter upon the DC voltage rising to the first comparison voltage and outputs a second count until the DC voltage decays to the second comparison voltage in each cycle of the DC voltage, and wherein the count signal reflects the second count minus half the first count.

10. The power supply circuit according to claim 6, wherein the compensation module comprises a flip-flop, a counter, an inverter, an oscillator, a register, a subtractor and a digital-to-analog converter, the flip-flop having an S terminal to receive the first comparison signal, the inverter then passing the first comparison signal on to the register, the flip-flop having an R terminal to receive the second comparison signal, the counter coupled to a Q terminal of the flip-flop, the oscillator, the register and the subtractor, the subtractor outputting the count signal to the digital-to-analog converter, the digital-to-analog converter connected to the main power stage module and configured to provide the compensation signal to the main power stage module.

11. The power supply circuit according to claim 10, wherein in response to input of signals output from the first and second comparators to the flip-flop, an enable signal is produced and input to the counter, wherein when the enable signal transitions from a low level to a high level, the counter starts to increment from zero, wherein when the enable signal transitions from the high level to the low level, the counter is stopped and reset to zero, and wherein an output of the subtractor is an output of the counter minus half an output of the register.

12. A compensation circuit configured for use in a switched-mode power supply system for total harmonic distortion compensation in the switched-mode power supply system, comprising:
 a voltage waveform detection module configured to detect a direct current (DC) voltage having a periodic dome-shaped waveform and output waveform information of the DC voltage,
 the voltage waveform detection module configured to receive the waveform information and generate a compensation signal based on a rising phase information and a falling phase information of each cycle of the DC voltage derived from the waveform information, the compensation signal configured to indicate a compensation operation to be performed for the switched-mode power supply system to accomplish the total harmonic distortion compensation in the switched-mode power supply system,
 wherein the compensation signal is configured to indicate adjusting an on-time and/or an off-time of a power switch in the switched-mode power supply system.

13. The compensation circuit according to claim 12, wherein during the on-time of the power switch, the compensation signal triggers the power switch to operate at least one of:
 decreasing the on-time in the rising phase of each cycle of the DC voltage; and
 increasing the on-time in the falling phase of each cycle of the DC voltage.

14. The compensation circuit according to claim 12, wherein during the off-time of the power switch, the compensation signal triggers the power switch to operate at least one of:
 increasing the off-time in the rising phase of each cycle of the DC voltage; and
 decreasing the off-time in the falling phase of each cycle of the DC voltage.

15. A harmonic distortion compensation method for a switched-mode power supply, comprising:
 detecting a rectified and filtered DC voltage having a periodic dome-shaped waveform;
 deriving, from the waveform, a rising phase information and a falling phase information of each cycle of the DC voltage; and
 generating a compensation signal based on the rising phase information and the falling phase information of each cycle, the compensation signal configured to trigger a main power stage module containing a power switch to perform a compensation operation based on the compensation signal, the compensation operation being performed to accomplish total harmonic distortion compensation of the switched-mode power supply system,
 wherein rising portions of the DC voltage waveform represent rising phases of individual cycles, and falling portions of the DC voltage waveform represent falling phases of individual cycles, and
 wherein the compensation signal indicates adjusting an on-time and/or an off-time of the power switch in the main power stage module.

16. The harmonic distortion compensation method for a switched-mode power supply according to claim 15, wherein generating the compensation signal based on the rising phase information and the falling phase information of each cycle and triggering the main power stage module containing the power switch to perform the compensation operation based on the compensation signal comprises:
 during the on-time of the power switch in the main power stage module, the compensation signal triggering the main power stage module to operate at least one of:
 decreasing the on-time in a rising phase of each cycle of an input voltage;
 increasing an on-time in a falling phase of each cycle of the input voltage; and
 simultaneously decreasing the on-time in the rising phase of each cycle of the input voltage and increasing the on-time in the falling phase of each cycle of the input voltage; and
 during the off-time of the power switch in the main power stage module, the compensation signal triggering the main power stage module to operate at least one of:
 increasing the off-time in the rising phase of each cycle of the input voltage;
 decreasing the off-time in the falling phase of each cycle of the input voltage; and
 simultaneously increasing the off-time in the rising phase of each cycle of the input voltage and decreasing the off-time in the falling phase of each cycle of the input voltage, and
 wherein the compensation signal indicates whether to change the on-time or off-time of the power switch in the main power stage, or to simultaneously change both the on-time and off-time of the power switch in the main power stage.

* * * * *